US012736211B2

(12) United States Patent
Loomis

(10) Patent No.: US 12,736,211 B2
(45) **Date of Patent: *Sep. 15, 2026**

(54) LIGHTING-ELEMENT ADAPTOR

(71) Applicant: Seasons 4, Inc., Toano, VA (US)

(72) Inventor: Jason Loomis, Decatur, GA (US)

(73) Assignee: Seasons 4, Inc., Toano, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/341,396

(22) Filed: Sep. 26, 2025

(65) Prior Publication Data

US 2026/0022806 A1 Jan. 22, 2026

Related U.S. Application Data

(63) Continuation-in-part of application No. 19/222,341, filed on May 29, 2025, which is a continuation-in-part (Continued)

(51) Int. Cl.

| | |
|---|---|
| ***F21V 23/04*** | (2006.01) |
| ***F21V 1/12*** | (2006.01) |

(Continued)

(52) U.S. Cl.

CPC ............ *F21V 23/0435* (2013.01); *F21V 1/12* (2013.01); *F21V 19/006* (2013.01); *F21V 23/06* (2013.01);

(Continued)

(58) Field of Classification Search

CPC ... F21V 19/006; F21V 19/0065; F21V 19/007

See application file for complete search history.

(56) References Cited

U.S. PATENT DOCUMENTS 2,221,505 A 11/1940 Benander
4,654,541 A * 3/1987 Angott ................ H01R 33/945 200/61.03

(Continued)

FOREIGN PATENT DOCUMENTS

KR 20130052469 A * 5/2013 .......... F21V 33/0056
KR 20240070885 A 5/2024
WO 2005001333 A2 1/2005

OTHER PUBLICATIONS

International Search Report and Written Opinion for International Patent Application No. PCT/US2025/038524, mailed Oct. 28, 2025, 13 pages.

*Primary Examiner* — Alexander K Garlen
(74) *Attorney, Agent, or Firm* — Kinney & Lange, P.A.

(57) ABSTRACT

Apparatus and associated methods relate to a lighting-element adaptor that has male and female power connectors axially aligned with one another along an axis of a body so as to be interposed between a lighting element and a lighting socket. A lamp shade/rain guard projects outward from the axis of the male and female power connectors with the male power connector projecting from a top surface of the lamp shade and the female power connector accessible from an underside of the lamp shade. The lighting-element adaptor includes a receiver configured to receive audio-control signals and/or an audio data stream. A speaker is configured to be provided electrical power from the electrical power received by the male power connector and to direct sound from the lamp shade, the sound based on the audio data stream.

20 Claims, 15 Drawing Sheets

Related U.S. Application Data of application No. 18/779,685, filed on Jul. 22, 2024, now Pat. No. 12,338,985.

(51) Int. Cl.

| | |
|---|---|
| ***F21V 19/00*** | (2006.01) |
| ***F21V 23/06*** | (2006.01) |
| ***F21V 33/00*** | (2006.01) |
| ***F21Y 115/10*** | (2016.01) |
| ***H04R 1/02*** | (2006.01) |

(52) U.S. Cl.

CPC ......... *F21V 33/0056* (2013.01); *H04R 1/028* (2013.01); *F21Y 2115/10* (2016.08)

(56) References Cited

U.S. PATENT DOCUMENTS

| | | | | |
|---|---|---|---|---|
| 5,121,287 | A | 6/1992 | Lee | |
| 7,844,060 | B2 | 11/2010 | Zulkowski | |
| 8,042,961 | B2 | 10/2011 | Massara et al. | |
| 8,872,417 | B2 | 10/2014 | Fatt et al. | |
| 9,265,119 | B2 | 2/2016 | Catalano et al. | |
| 10,264,170 | B2 | 4/2019 | Chien | |
| 11,073,261 | B1 | 7/2021 | Huang | |
| 2006/0012980 | A1 | 1/2006 | Mize | |
| 2006/0033454 | A1 * | 2/2006 | Mathews | H05B 47/185 315/294 |
| 2006/0039570 | A1 | 2/2006 | Yeh | |
| 2007/0110266 | A1 | 5/2007 | Zulkowski | |
| 2009/0260504 | A1 | 10/2009 | Chen | |
| 2010/0330843 | A1 | 12/2010 | Gao et al. | |
| 2012/0120243 | A1 | 5/2012 | Chien | |
| 2013/0308315 | A1 | 11/2013 | Capitani et al. | |
| 2014/0268697 | A1 | 9/2014 | Smith et al. | |
| 2014/0285999 | A1 | 9/2014 | Luna et al. | |
| 2015/0109784 | A1 | 4/2015 | Baschnagel | |
| 2015/0159825 | A1 * | 6/2015 | Flynn | H01R 33/9453 362/183 |
| 2016/0215933 | A1 | 7/2016 | Skelton et al. | |
| 2018/0145446 | A1 | 5/2018 | Archuleta et al. | |
| 2023/0086995 | A1 | 3/2023 | Zhang et al. | |
| 2023/0155335 | A1 | 5/2023 | Stewart et al. | |

* cited by examiner

LIGHTING-ELEMENT ADAPTOR

BACKGROUND

Various venues where people gather provide music for ambiance so as to attract patrons and guests thereto. For example, various outdoor venues can be used for dining, for listening to invited speakers, for concerts, etc. Many such venues will provide lighting for guests attending such events. Some such outdoor lighting systems can be permanently constructed or temporarily constructed. One such form of outdoor lighting uses café lighting strings. Café light strings are strings of lights configured to provide lighting over an open expanse, such as, for example, a grassy lawn or a patio. These café lights are usually configured as strings of lights suspended over the open expanse between securing structures.

SUMMARY

Some embodiments relate to a lighting-element adaptor that includes male and female power connectors axially aligned with one another along an axis. The male power connector is configured to connect to an overhead lighting socket so as to receive electrical power therefrom. The female power connector is configured to be provided electrical power from the electrical power received by the male power connector. The female power connector is configured to receive a lighting element so as to provide illumination. The lighting-element adaptor includes a lamp shade/rain guard projecting outward from the axis of the male and female power connectors with the male power connector projecting from a top surface of the lamp shade and the female power connector accessible from an underside of the lamp shade. The lampshade is configured to receive and block a blocked portion of light emitted from the lighting element received in the female power connector. The lighting-element adaptor includes a receiver configured to receive audio-control signals and/or an audio data stream. The lighting-element adaptor includes a speaker configured to be provided electrical power from the electrical power received by the male power connector and to direct sound from the lamp shade. The sound directed by the speaker is based on the audio data stream.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Apparatus and associated methods relate to a lighting-element adaptor that has male and female power connectors axially aligned with one another along an axis of a body so as to be interposed between a lighting element and a lighting socket. A lamp shade/rain guard projects outward from the axis of the male and female power connectors with the male power connector projecting from a top surface of the lamp shade and the female power connector accessible from an underside of the lamp shade. The lighting-element adaptor includes a receiver configured to receive audio-control signals and/or an audio data stream. A speaker is configured to be provided electrical power from the electrical power received by the male power connector and to direct sound from the lamp shade, the sound based on the audio data stream.

Figure 1:
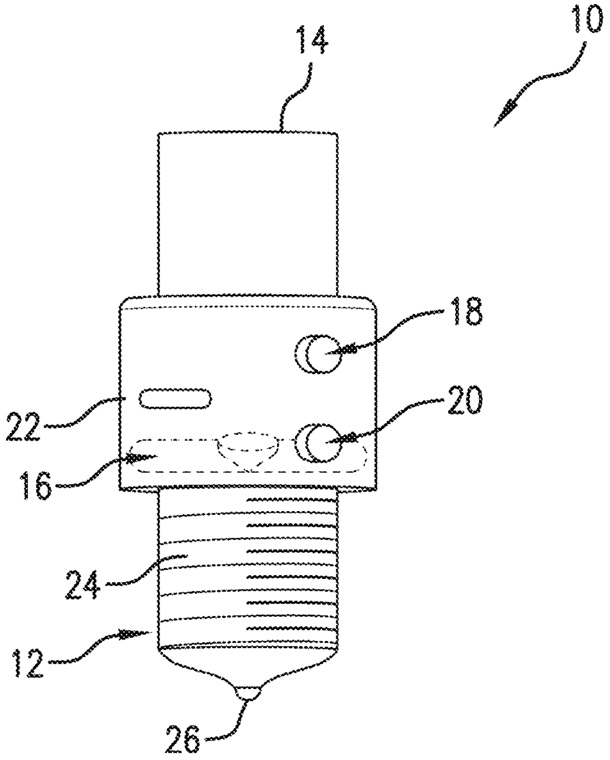
FIG. 1 is a side elevation view of a light element adaptor.

FIG. 1 is a side elevation view of a light element adaptor. In FIG. 1, light element adaptor 10 has male AC-power connector 12, female AC-power connector 14, AC/DC power converter 16, AC power switch 18, DC power switch 20 and DC-power connector 22, which in the depicted embodiment is a USB-C type of power connector. Various other industry standard low-voltage connectors could be used for providing DC-power to connected devices. Such other low-voltage connectors include, for example, USB-A, USB-B, USB-C, Micro-USB, Mini-USB, Lightning Connectors (e.g., proprietary connectors used by Apple™ for iPhones™, iPads™, and other Apple™ devices), Barrel Connectors (i.e., round connectors commonly used for DC power input on laptops and other devices), etc.

In the depicted embodiment, male and female AC-power connectors 12 and 14 are complementary to one another. Such complementarity of male and female AC-power connectors enables light element adaptor 10 to be interposed between a lighting element and a lighting socket configured to receive the lighting element. For example, the lighting element can be removed from the lighting socket by removing a male AC-power connector of the lighting element from the lighting socket. Male AC-power connector 12 of lighting-element adaptor 10, being made according to the same standard as the male AC-power connector of the lighting element, can then be inserted into the lighting socket. Female AC-power connector 14 of lighting-element adaptor 10, being made according to the same standard as the female AC-power connector of the lighting socket, can then receive the male AC-power connector of the lighting element therein.

Male and female AC-power connectors 12 and 14 are conductively coupled to one another, such that female AC-power connector 14 provides AC power received by male AC-power connector 12 to the lighting element connected to female AC-power connector 14. In the depicted embodiment, AC power is selectively provided to female AC-power connector 14 via AC-power switch 18. In other embodiments, female AC-power connector 14 and male AC-power connector 12 are hardwire connected to one another. In such a hardwired configuration, the lighting element is provided AC power regardless of whether the lighting element is directly connected or indirectly connected, via light element adaptor 10, to the lighting socket. Moreover, male and female AC-power connectors 12 and 14 are axially aligned with one another along common axis A, as depicted in FIG. 1. Such alignment ensures that the lighting element is located along axis A, regardless of whether the lighting element is directly connected or indirectly connected, via light element adaptor 10, to the lighting socket. Even if lighting-element adaptor 10 is interposed between the lighting element and its lighting socket, the lighting element will remain aligned with axis A, although the lighting element will reside further from the lighting socket. Thus, as long as space exists along axis A, lighting-element adaptor 10 can be interposed between the lighting element and its lighting socket.

Lighting-element adaptor 10 is configured to be modestly sized, so as to minimize the difference between locations where the lighting element resides when it is directly connected to a lighting socket and where the lighting element resides when indirectly connected to the lighting socket via lighting element adapter 10. To reduce this difference between such locations, lighting element adapter is configured with proximity between male and female AC-power connectors 12 and 14. Various metrics of such proximities can be used to characterize such location difference. For example, this difference in locations can be measured as a ratio between a first axially dimension as measured between a top of female AC-power connector 14 to a bottom center of female AC-power connector 14 (e.g., to the hot contact located at the bottom of female E-type connectors) and a second axial dimension as measured between the top of female AC-power connector 14 to a bottom center (e.g., to the hot contact located at the bottom of male E-type connectors) of male AC-power connector 12. This is a ratio of the axial dimension of the contacting elements of the lighting contact and the height of lighting-element adaptor 10. Such a ratio can be greater than 25%, 33%, 40%, for example. In a limiting embodiment, such a ratio could nearly approach 50% as female AC-power connector 14 is located immediately adjacent (i.e., immediately above or below) male AC-power connector 12.

Another metric of such a location difference could be, for example, a ratio between a third dimension as measured between a top of the female AC-power connector 14 to a bottom of female AC-power connector 14 (i.e., the actual axial dimension of the contacting elements of the lighting contact) and a fourth dimension as measured between the bottom of female AC-power connector 14 to the bottom of male AC-power connector 12 (i.e., the actual lighting element displacement by lighting-element adaptor 10). This is a ratio of the axial dimension of the contacting elements of the lighting contact and the actual lighting element displacement caused by interposing lighting-element adaptor 10. Such a ratio can be greater than 50%, 67%, 75%, 90% for example. In a limiting embodiment, such a ratio could nearly approach 100% as female AC-power connector 14 is located immediately adjacent (i.e., immediately above or below) male AC-power connector 12.

In the depicted embodiment, male and female AC-power connectors 12 and 14 are E-type lighting connectors, such as, for example, E12, E17, E26 and E27 sized lighting connectors. Female AC-power connector 14 is configured to receive a male E-type lighting connector, such as are commonly used for many types of lighting elements. Male AC-power connector 12 is configured to engage an E-type lighting socket so as to receive AC operating power therefrom. Such E-type lighting connectors provide power connector via threaded substantially-cylindrical male and female counterparts. Male AC-power connector 12 includes insulating region 22 providing electrical isolation between neutral contact 24 and hot contact 26. Hot contact 26 is located at a central end portion of male AC-power connector 12 along axis A. Hot contact 26 is located at a base of the substantially-cylindrical male AC-power connector 10. The sidewalls (e.g., substantially-cylindrical exterior surface) of male AC-power connecter are conductive and threaded. The conductivity of these sidewalls facilitates electrical connection with sidewalls (e.g., substantially-cylindrical interior surface) of a complementary female AC-power connector of a lighting socket. The threading of the sidewalls of male AC-power connector facilitates mechanical engagement with threading of the complementary female AC-power connector of a lighting socket. Although E-type lighting connectors are depicted in the FIG. 1 embodiment, various other types of complementary lighting connectors, as are used in the art, can be used for complementary AC-power connectors 12 and 14.

AC/DC power converter 16 is conductively coupled to male AC-power connector 12 so as to receive AC power therefrom. AC/DC power converter 16 is configured to generate DC power from the AC power received. Such DC power can then be provided to any of a variety of DC-powered devices that are often used in lighted venues, such as, for example, Bluetooth speakers. AC/DC power converter 16 can provide the DC power generated to a DC-powered device connected thereto via DC-power connector 22. In the depicted embodiment, DC power is selectively provided to DC-power connector 22 via DC-power switch 20. In other embodiments, the DC power generated is continually provided to DC-power connector 22, without selective interruption by a DC power switch.

FIGS. 2A-2D are perspective views of various embodiments of a light element adaptor. In FIGS. 2A-2D, lighting-element adaptors 10*a*, 10*b*, and 10*c* are depicted. Each of lighting-element adaptors 10*a*, 10*b* and 10*c* include male AC-power connector 12, female AC-power connector 14, AC/DC power converter 16 (enclosed within lighting-element adaptors 10*a*-10*c*), and annular recess 28, which can be configured to engage with an attachment, such as, for example, a wire frame of a lamp shade and/or an audio speaker. Each of lighting element adapters 10*a*-10*c* differ from one another in the manner in which DC power is provided to DC-powered devices connected thereto. Lighting-element adaptor 10*a* has DC-power connector 22*a*, which is a USB type of DC power connector. Lighting-element adaptor 10*b* has DC-power connector 22*b*, which is located within annular recess 28 of lighting-element adaptor 10*b*. Such a configuration can be used to provide DC power to an LED illuminated rain guard or lamp shade, for example. Lighting element 10*c* has DC-power connector 22*c*, which is located in or on a peripheral surface of body portion 30 surrounding female AC-power connector 14. Lighting element 10*c* also has AC power switch 18 and DC power switch 20 for enabling user selection of both AC power to female AC-power connector 14 and DC power to DC-power connector 22*c*.

In some embodiments, light element adaptors 10*a*, 10*b*, and/or 10*c* can include a receiver and a con for receiving signals that configure light element adaptor 10*a*, 10*b*, and/or 10*c* in some manner. For example, light element adaptors

10*a*, 10*b* and/or 10*c* can include such a receiver for receiving signals: i) that command the lighting-element adaptors 10*a*, 10*b*, and/or 10*c* to selectively provide AC power to female AC-power connector; ii) that command the lighting-element adaptors 10*a*, 10*b*, and/or 10*c* to selectively provides the DC power generated to DC-power connectors 22*a*, 22*b*, and/or 22*c*; iii) that command the lighting-element adaptors 10*a*, 10*b*, and/or 10*c* to control the voltage of power provided to DC-power connectors 22*a*, 22*b*, and/or 22*c*; and/or iv) containing audio that is provided to a speaker connected to light element adaptor 10*a*, 10*b*, and/or 10*c*. Similarly, in some embodiments the receiver can be configured to receive commands, for example, that selectively provide to female AC-power connector 14 the AC power received by male AC-power connector 12. The receiver can be either one that receives signals using an industry standard protocol, or one that receives signals using a proprietary protocol. Such communicated signals can be: i) signals multiplexed on the AC power received by male AC-power connector 12; ii) optical signals; or iii) electromagnetic waves of other frequencies. Some industry standard protocols for electromagnetic waves include, for example, Bluetooth (e.g., Bluetooth Classic, Bluetooth Low Energy, Bluetooth 5.x, etc.) Wi-Fi (e.g., standards include 802.11a/b/g/n/ac/ax), RF, NFC, IR, Zigbee (e.g., standards include 802.15.4), Z-Wave, LoRa, etc.

Figure 3A:
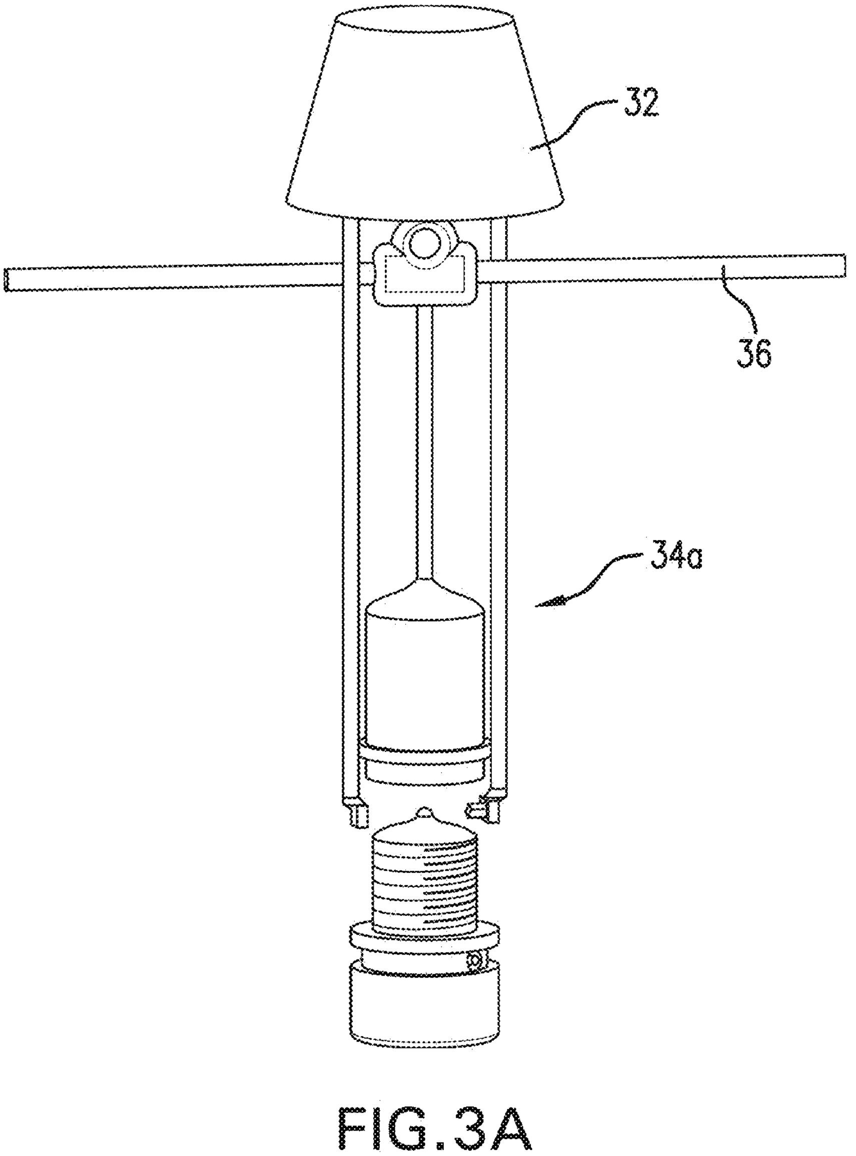
FIGS. 3A-3C are perspective views of a speaker configured to couple to the light element adapter shown in FIG. 2B.
Figure 3B:
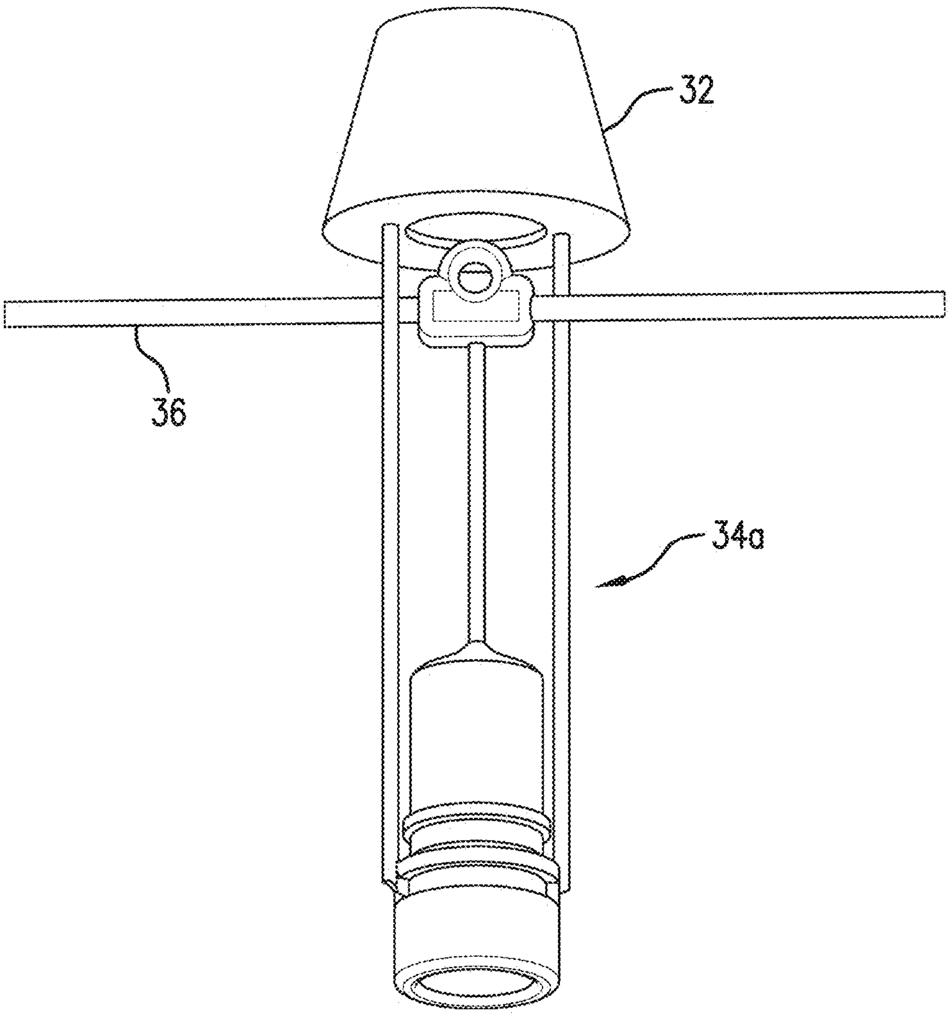
Figure 3C:
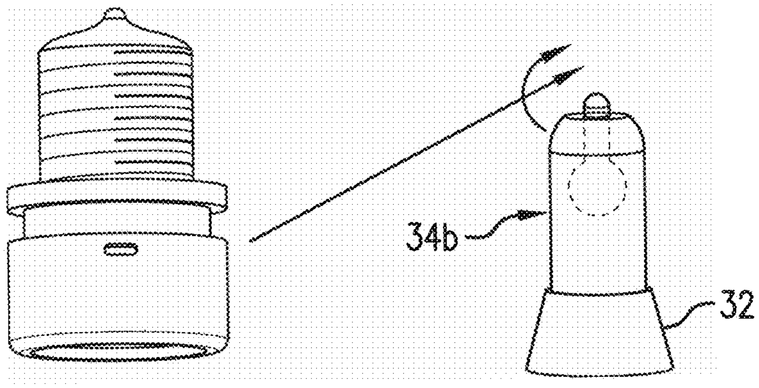

In some embodiments, light element adaptors 10*a*, 10*b*, and/or 10*c* can include an adaptor controller for configuring the lighting-element adaptor in response to commands received by the receiver. The adaptor controller can be configured, for example, to perform the operations indicated by the signals received by the receiver FIGS. 3A-3C are perspective views of a speaker configured to couple to the light element adapter shown in FIG. 2B. In FIGS. 3A-3C, Speaker 32 is coupled to lighting-element adaptor 10*b* via connecting mechanism (either connecting mechanism 34*a* or 34*b*). Connecting mechanisms 34*a* and 34*b* can be configured to provide both mechanical connection of speaker 32 to lighting-element adaptor 10*b* and electrical connection of Speaker 32 to DC-power connector 22 of lighting-element adaptor 10*b*. In the depicted embodiment, lighting-element adaptor 10*b* is coupled to café lighting string 36. In the embodiments depicted in FIGS. 3A and 3B, connecting mechanism 34*a* is configured to position speaker 32 above café light string 36, thereby not obscuring light emitted by a lighting element received within female AC-power connector 14 of lighting-element adaptor 10*b*. In the embodiment depicted in FIG. 3C, connecting mechanism 34*b* is configured to position speaker 32 below café light string 36 thereby partially obscuring light emitted by a lighting element received within female AC-power connector 14 of lighting-element adaptor 10*b*. In both embodiments, sound can be emitted in downward direction and/or in 360° radial directions about speaker 32. Such directions for emitting sound can be most efficacious for listeners who sit below café light string 36.

Figure 2A:
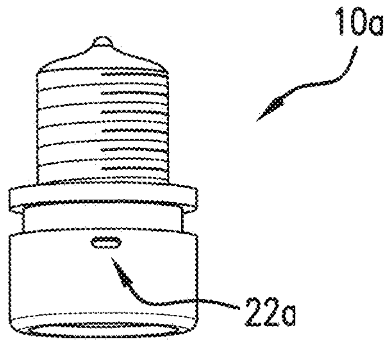
FIGS. 2A-2D are perspective views of various embodiments of a light element adaptor.
Figure 2B:
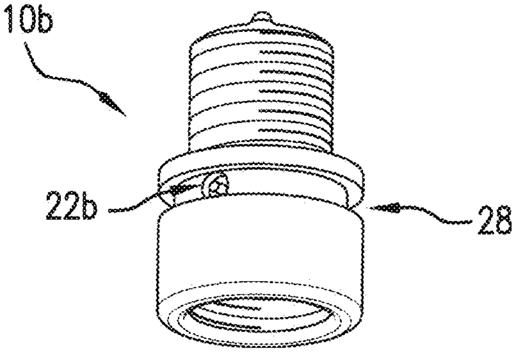
Figure 2C:
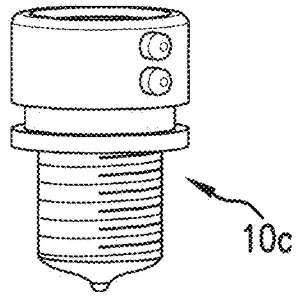
Figure 2D:
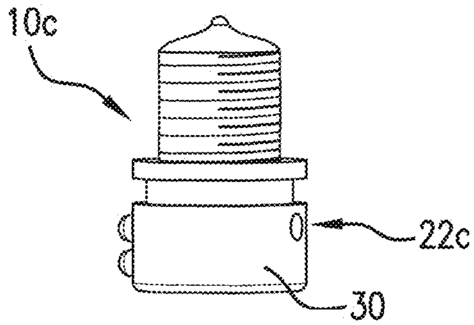
Figure 4:
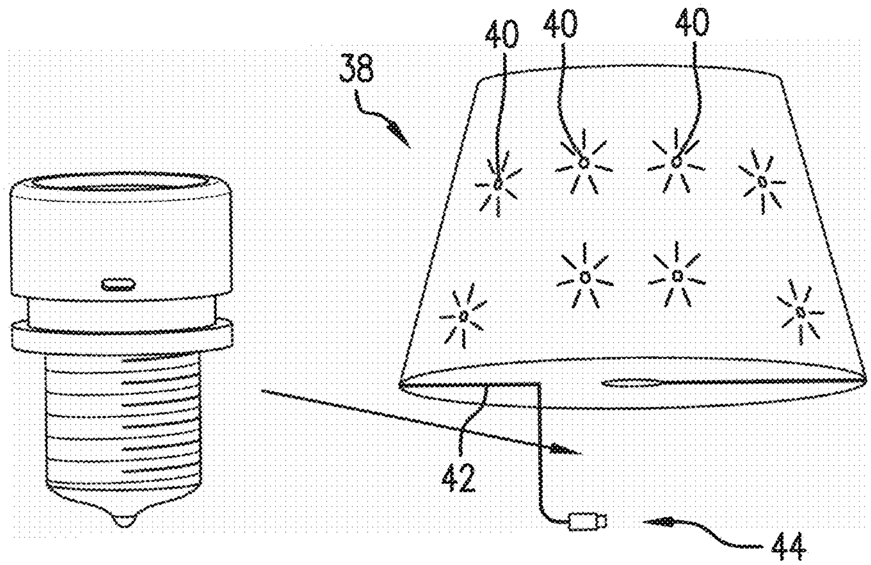
FIG. 4 is a perspective view of an LED-illuminated lamp shade configured to receive DC operating power from the light element adaptors shown in FIGS. 2A.

FIG. 4 is a perspective view of an LED-illuminated lamp shade configured to receive DC operating power from the light element adaptors shown in FIGS. 2A. In FIG. 4, illuminating rain guard 38 includes LEDs 40, wireframe 42, and power connector 44. LEDs 40 are affixed at various locations upon illuminated rain guard 38. LEDs 40 can be made to form various designs or in the various shapes of objects. Operating power for LEDs 40 is supplied by DC-power connector 22 of lighting-element adaptor 10*a*, via power connector 44, which can be connected thereto. Wireframe 42 can be configured to mechanically couple with either a base of a lamp and/or with lighting-element adaptor 10*a*.

Figure 5:
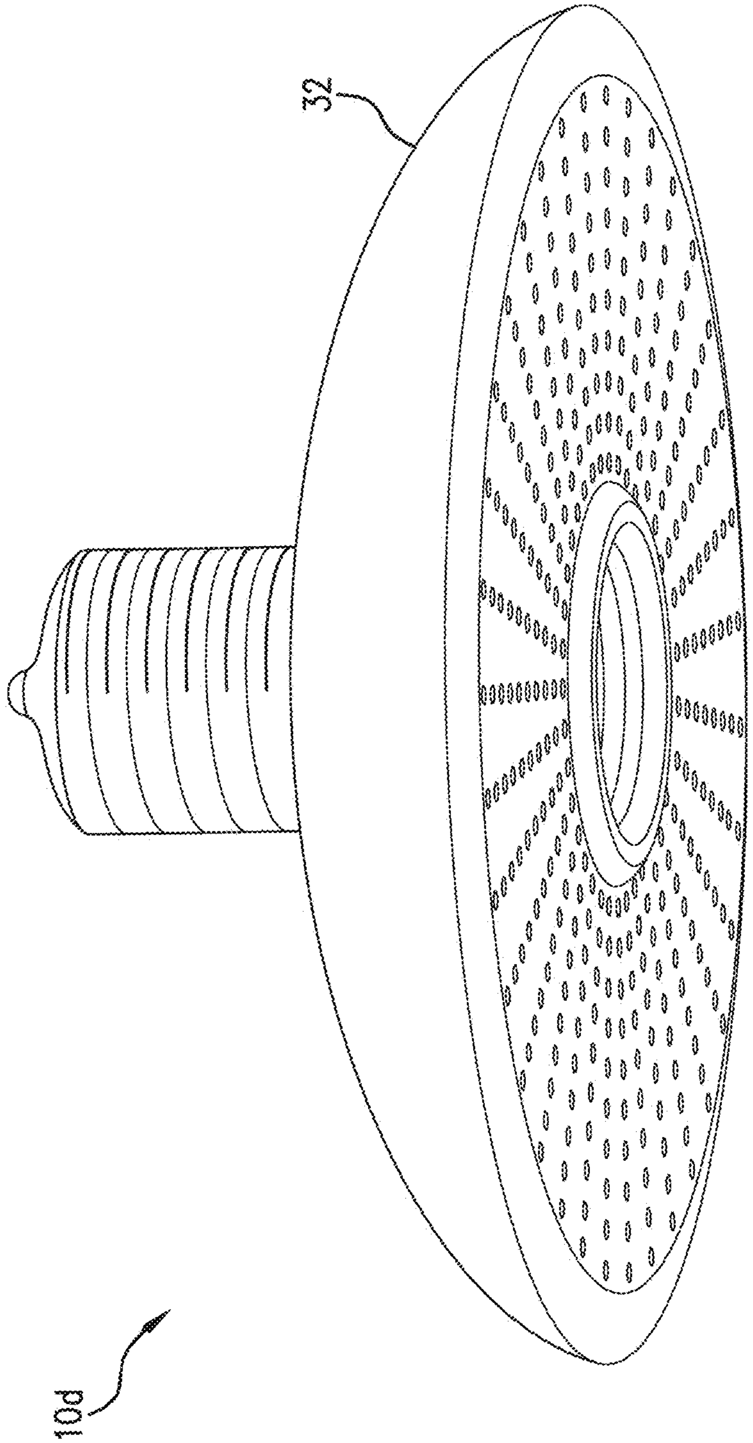
FIG. 5 is a perspective view of a speaker integrated with a lighting-element adaptor.

FIG. 5 is a perspective view of a speaker integrated with a lighting-element adaptor. In FIG. 5, integrated lighting-element adaptor/speaker 10*d* is a unitary body that is configured to be interposed between a lighting element and a lighting socket while providing audio capabilities via speaker 32. Speaker 32 is configured to receive DC operating power from an AC/DC-power converter located within lighting-element adaptor/speaker 10*d*. Lighting element adaptor 10*d* can include a receiver, which is configured to receive audio signals transmitted by a transmitter. Speaker 32 is configured to generate sound based on the signal received by the receiver. In some embodiments, lighting-element adaptor 10*d* can be configured as a node of a mesh network. Lighting element adapter 10*d* can include a transceiver that can transmit messages over the mesh network, for example. Such a mesh network can be used to coordinate a plurality of speakers. Such coordination can ensure that the plurality of speakers is synchronized so as to play the same music at the same time.

Figure 6A:
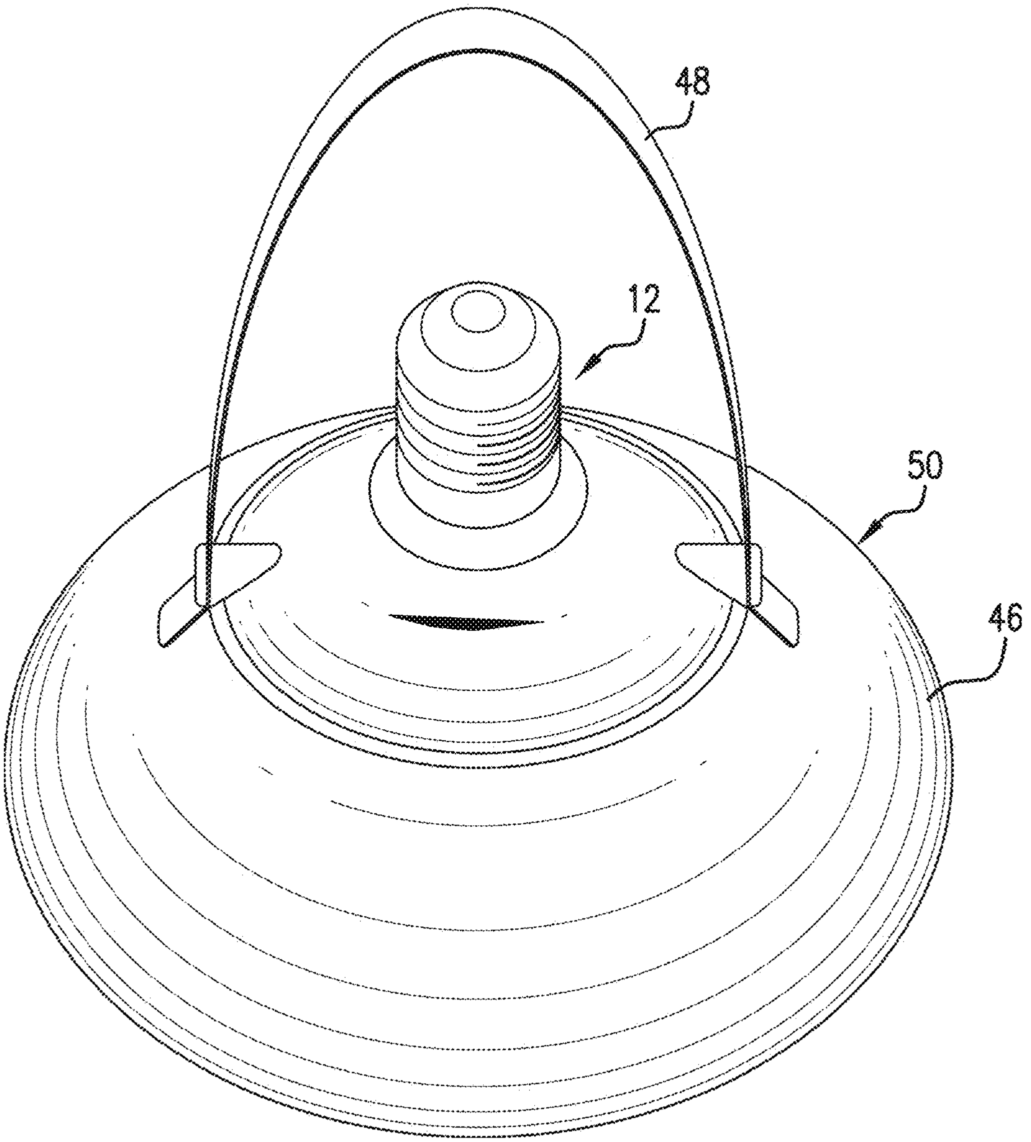
FIGS. 6A-6D are a perspective view, a bottom view, a cross-sectional view, and an exploded view of an embodiment of a light element adapter with a rain guard/lamp shade.
Figure 6B:
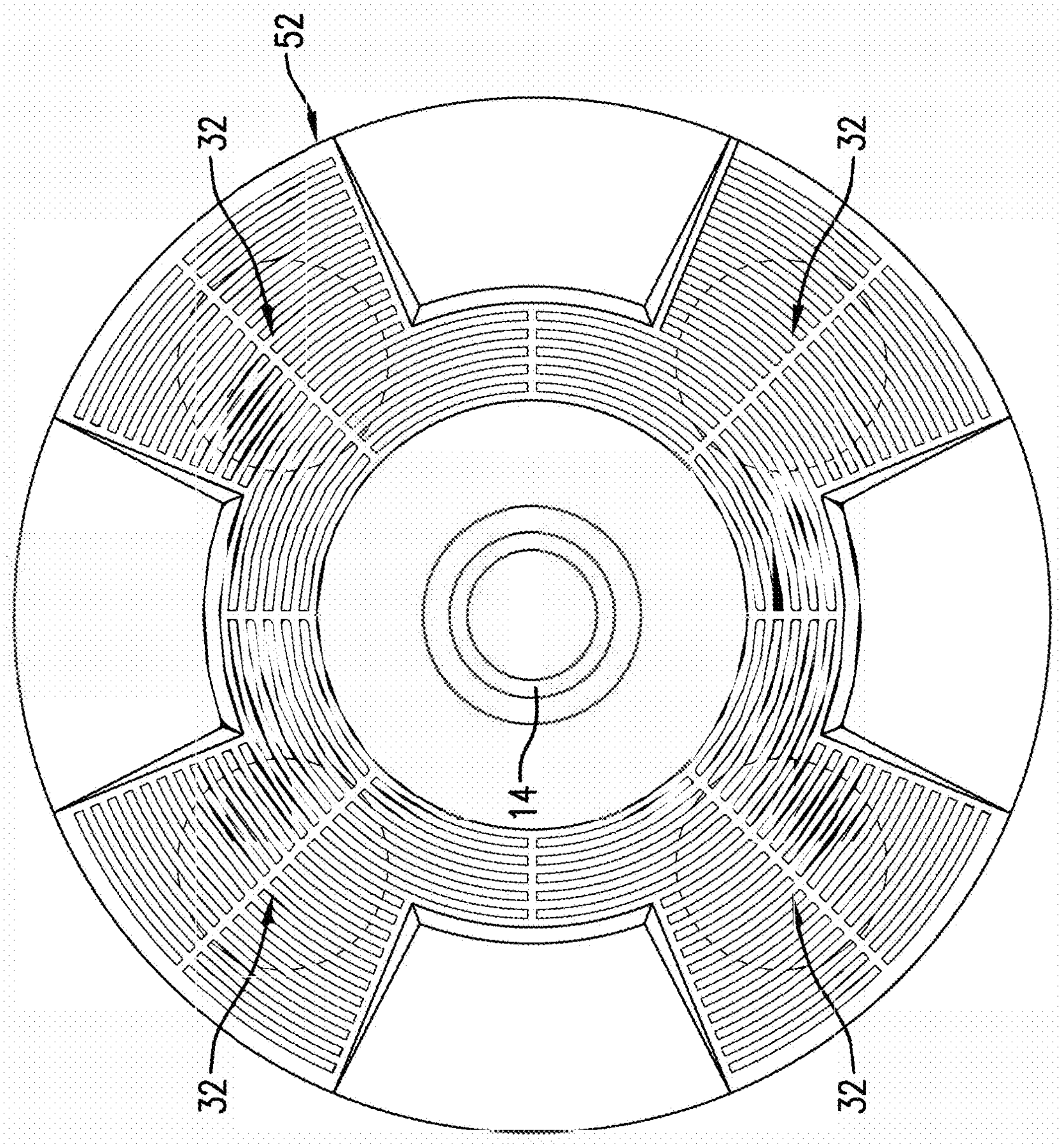
Figure 6C:
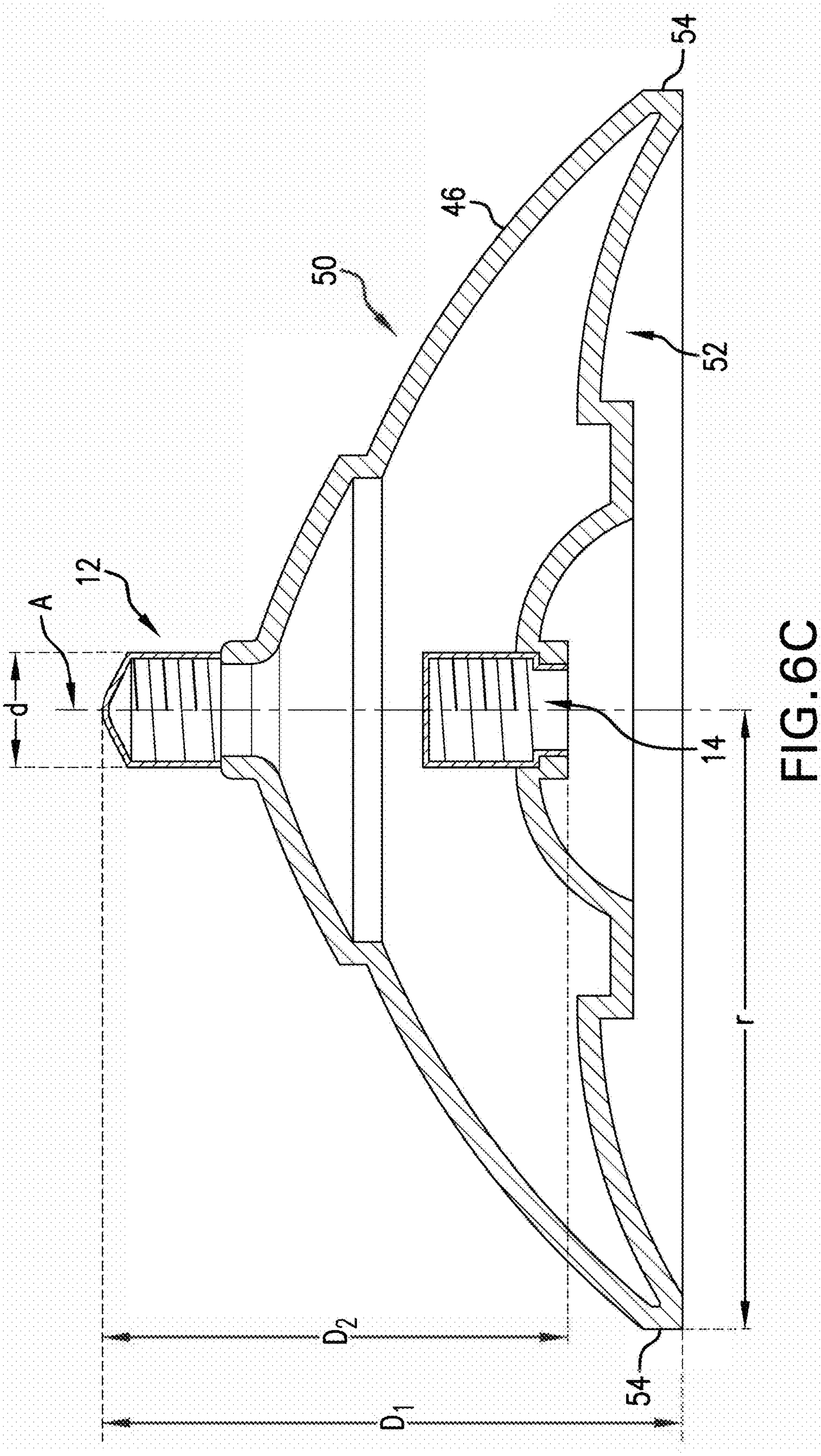
Figure 6D:
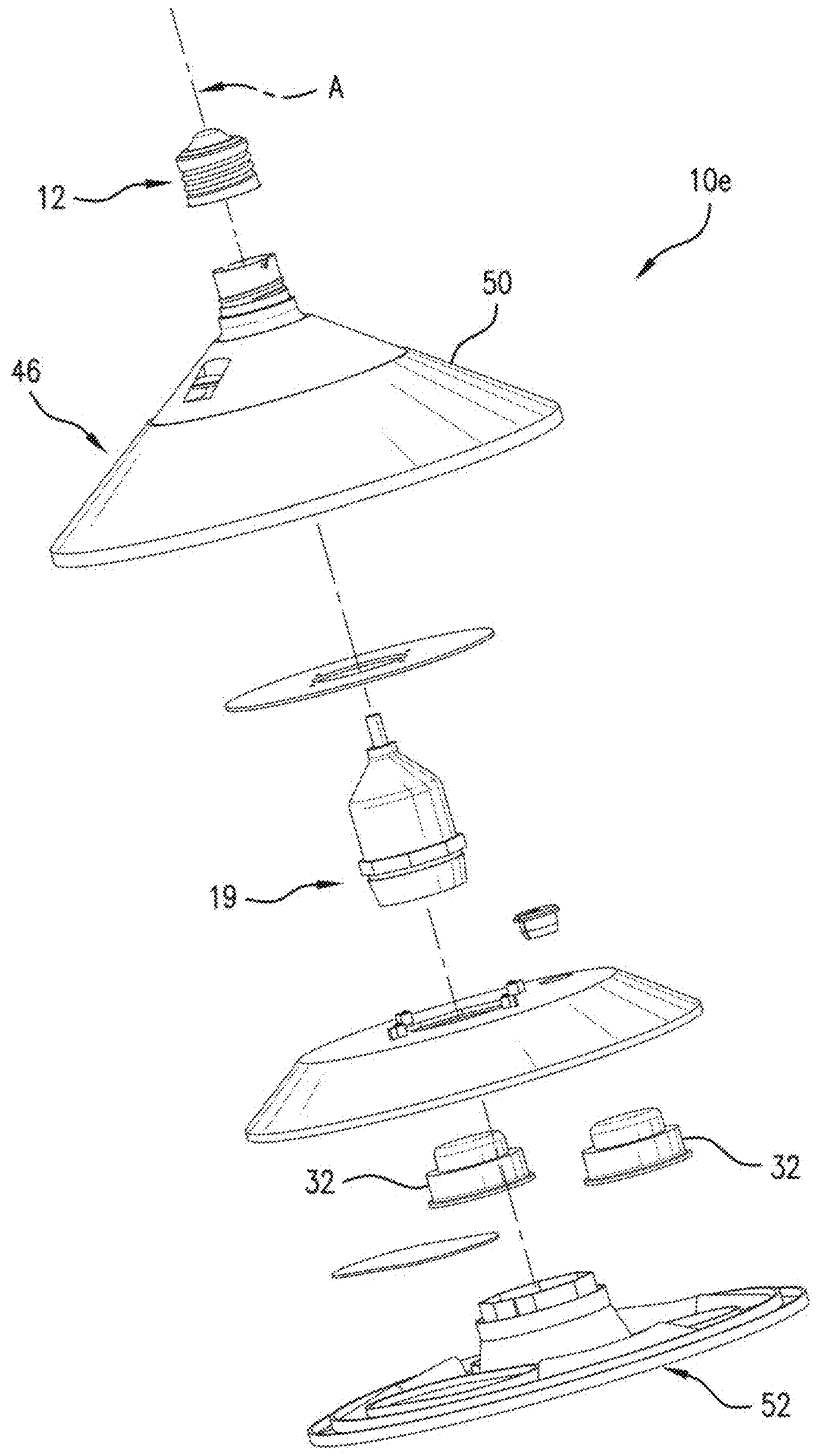

FIGS. 6A-6D are a perspective view, a bottom view, a cross-sectional view, and an exploded view of an embodiment of a light element adapter with speakers built into a rain guard/lamp shade. These terms 'rain guard' and 'lamp shade' are used interchangeably herein. Although used interchangeably, some functions performed by the rain guard/lamp shade are more rain guard in nature, and other functions performed by the rain guard/lamp shade are more lamp shade in nature. For example, the 'rain guard' directs any rain to a peripheral drip edge, thereby protecting the electrical components of the lighting-element adaptor, while the 'lamp shade' controls directions of light emission into an external environment from the lighting element received within the female lighting socket. In FIGS. 6A-6C, light element adaptor 10*e* includes male AC-power connector 12, female AC-power connector 14, speakers 32, rain guard 46, and safety tether 48. Rain guard 46 has top and bottom surfaces, 50 and 52, that are shaped to provide rain protection to speakers 32 and female AC-power connector 14. Rain guard 46 projects radially outward from axis A of complementary male and female AC-power connectors 12 and 14, with male AC-power connector 12 projecting from top surface 50 of rain guard 46 and female AC-power connector 14 located in bottom surface 52 of rain guard 46. In the depicted embodiment, female AC-power connector 14 is recessed into bottom surface 52. Rain guard 46 has peripheral drip edge 54 that circumscribes female AC-power connector 14, thereby providing rain protection thereto. In some embodiments, peripheral drip edge extends below female AC-power connector 14, as it does in the depicted embodiment. In such embodiments, a first axial distance $d_1$, as measured from a top of male AC-power connector 12 to a bottom of peripheral drip edge 54, is greater than a second axial distance $d_2$, as measured from the top of male AC-power connector 12 to a bottom of female AC-power connector 14.

Speakers 32 are located within rain guard 46 and are configured to provide sound through openings in bottom surface 50. Speakers can be powered by an AC/DC power converter configured to generate DC power from the AC power received by the male AC-power connector. A Top surface 50 has a downward slope in radial directions from locations adjacent to male AC-power connector 12 to peripheral drip edge 54 of rain guard 46. In some embodiments, peripheral drip edge 54 of rain guard 46 has a projecting annulus that projects downward from bottom surface 52. Such a downward radial slope directs water away from axis A, thereby providing rain protection for speakers 32 and a lighting element connected to female AC-power connector 14. Although speakers 32 are depicted in FIG. 6B, speakers might not be provided at all lighting locations at a venue, yet rain protection might still be desirable for all lighting locations. To address this need, some embodiments do not have speakers 32 within rain guard 46. Such speakerless lighting adapters maintain a uniform appearance throughout the venue, without incurring any additional costs for speakers. Rain guard 46 has a minimum radial distance r from the axis to the drip edges being greater than 4, 6, 8, 10, or more times a diameter d of male AC-power connector 12 (and/or of female AC-power connector 14). Such dimensions ensure that any lighting element connected to female AC-power connector 14 is well protected from rain, even from a blowing rain. Moreover, the downward slope in radial directions of top surface 50 facilitates rotation of lighting-element adaptor 10 in response to blowing rains, thereby providing additional protection of any lighting elements connected to female AC-power connector 14.

Safety tether 48 is configured to be secured about an overhead power cable, such as those used in café lighting strings. When secured to such an overhead power cable, the lighting element adapter can hang from safety tether 48 in response to male AC-power connector 12 disengaging from the overhead lighting socket. Moreover, by supporting lighting-element adaptor 10 by safety tether 48, stress can be reduced for male AC-power connector 12, as such a connector need not provide mechanical support. In the depicted embodiment, safety tether 48 has two ends configured to couple to two opposite sides of rain guard 46 of lighting-element adaptor 10.

Figure 7A:
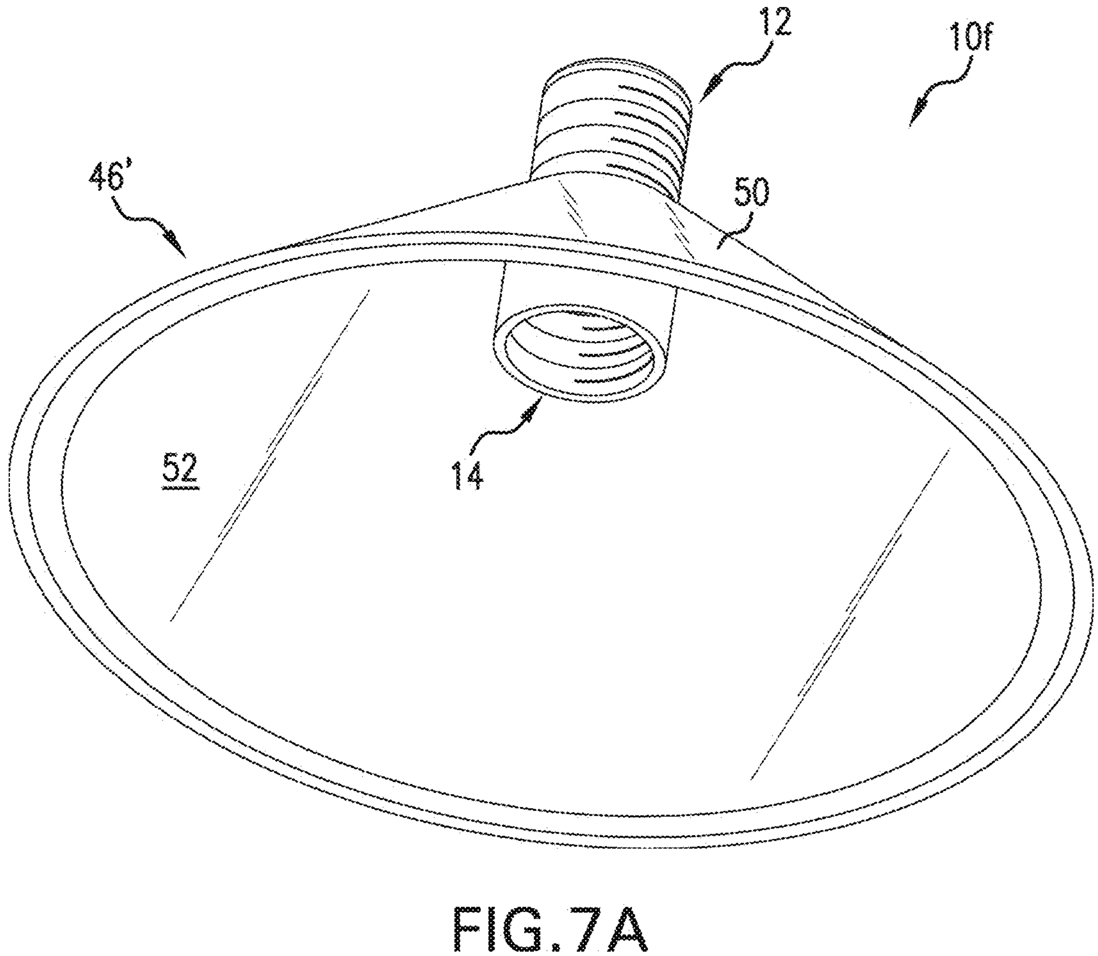
FIG. 7A-7C are a perspective view, a side view, and a cross-sectional view of an embodiment of a light element adapter with an illuminated rain guard.
Figure 7B:
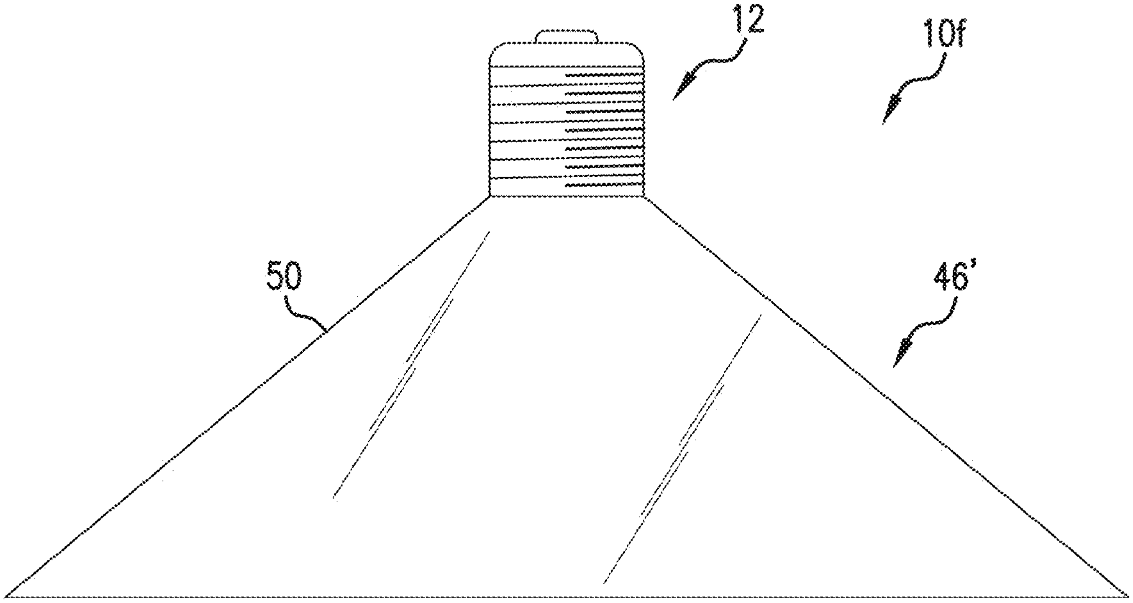
Figure 7C:
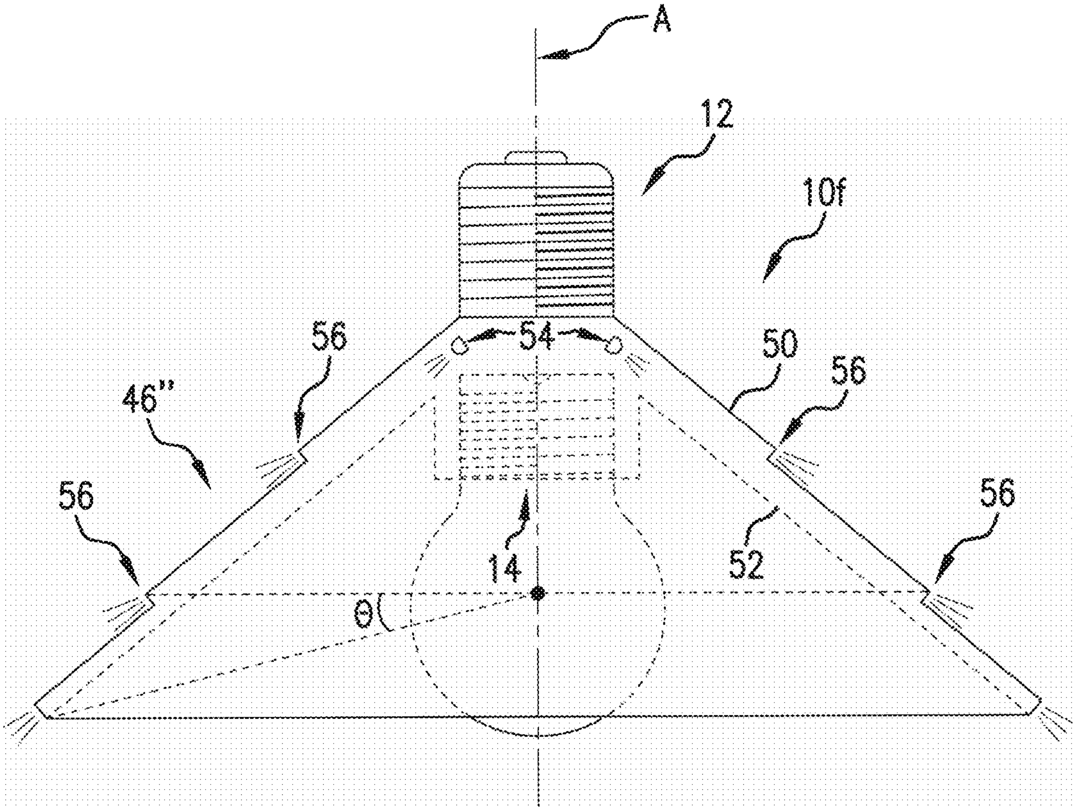

FIGS. 7A-7C are a perspective view, a side view, and a cross-sectional view of an embodiment of a light element adapter with an illuminated rain guard. In FIGS. 7A-7C, light element adaptor 10*f* includes male AC-power connector 12, female AC-power connector 14, and rain guard 46' (which can also serve as a light shade for directional lighting), and LEDs 54. Rain guard 46' has top and bottom surfaces, 50 and 52, that are shaped to provide rain protection to female AC-power connector 14. Rain guard 46' projects radially outward from axis A of complementary male and female AC-power connectors 12 and 14, with male AC-power connector 12 projecting from top surface 50 of rain guard 46' and female AC-power connector 14 accessible from an underside of rain guard 46'. Rain guard 46' is designed to be illuminated. As such, rain guard 46' includes transparent and/or translucent materials. For example, the body or structure of rain guard 46' can be substantially transparent (i.e., have a coefficient of transmission greater than 90% or a coefficient of absorption of less than 10%). Rain guard 46' can be illuminated by various sources of light. For example, top surface 50 of rain guard 46' can be coated and/or treated to facilitate capture of sunlight.

LEDs 54 can also be used to illuminate rain guard 46'. LEDs 54 can be uniformly distributed about axis A so as to illuminate rain guard 46' in a plurality of radial directions about axis A. In the depicted embodiment, LEDs 54 transmit light into rain guard 46' near a location where rain guard 46' connected to male connector 12. Rain guard 46' acts as a light pipe for light transmitted thereto. Top surface 50 and/or bottom surface 52 can be coated and/or treated so as to facilitate light scattering from top surface 50 and/or bottom surface 52. Rain guard 46' can be configured to transmit some, if not most, of the light transmitted within rain guard 46' to a peripheral face, from which it can be emitted. In the depicted embodiment such a face of emission is a circular peripheral face. In other embodiments, top surface 50 and or bottom surface 52 can surface discontinuities from which the light transmitted within rain guard 46' can escape.

In FIG. 7C, a cross-section of such a rain guard 46" having top-surface texture, pattern and/or discontinuities is depicted. Rain guard 46" includes top-surface texture, pattern and/or discontinuities 55, from which light provided by LEDs 54 (or provided from sunlight capture) escapes from rain guard 46". Although depicted only in top surface 50, such top-surface texture, pattern and/or discontinuities 55 can be formed in bottom surface 52 or in both top and bottom surfaces 50 and 52. Such top-surface texture, pattern and/or discontinuities 55 can be formed into design patterns and/or words, for example. Such top-surface texture, pattern and/or discontinuities 55 can be used for decorative purposes, for advertising, and/or for other purposes. Although light element adaptor 10*f* is depicted without speakers, rain guard 46" can be used in combinations with speakers as well.

Figure 8:
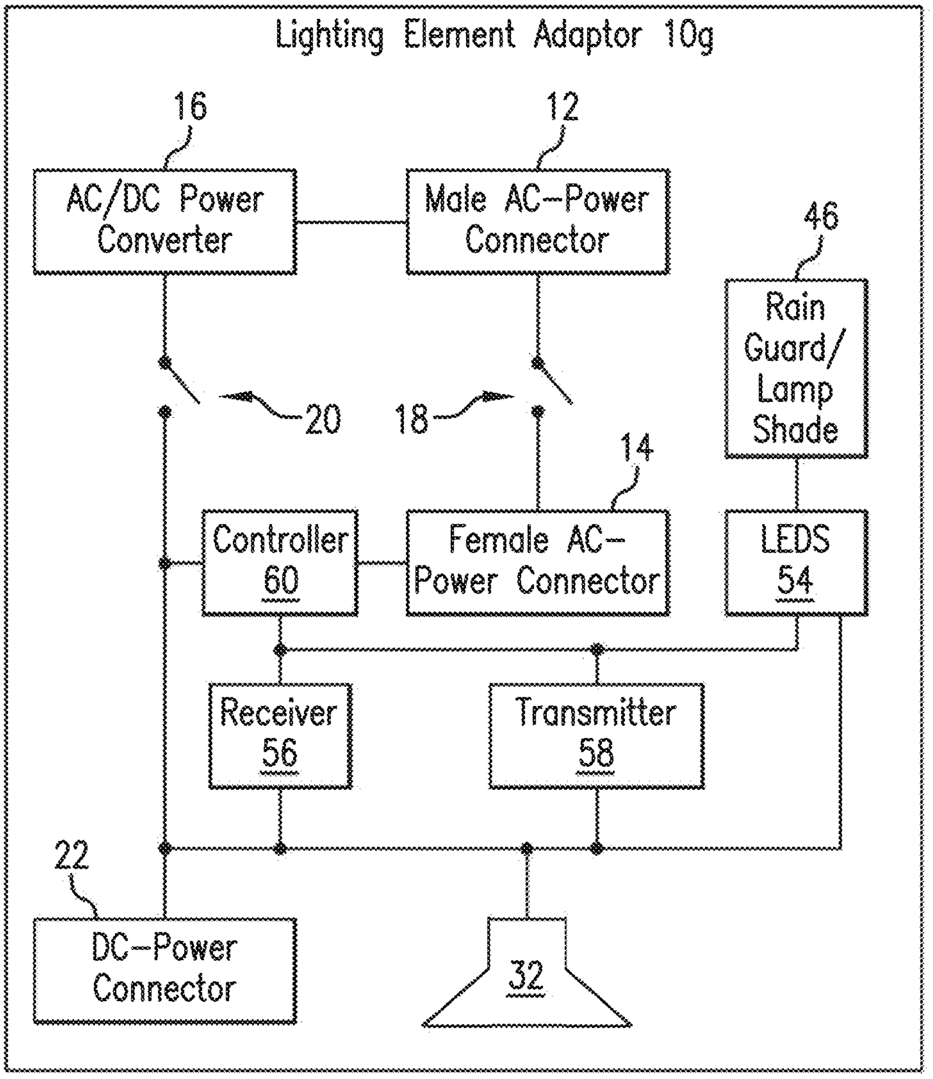
FIG. 8 is a block diagram of a lighting-element adaptor with a receiver and a controller.

FIG. 8 is a block diagram of a lighting-element adaptor with a receiver and an adaptor controller. In FIG. 8, lighting-element adaptor 10*g* includes male AC-power connector 12, female AC-power connector 14, AC/DC power converter 16, AC power switch 18, DC power switch 20, ad DC-power connector 22, speaker 32, lamp shade/rain guard 46, LEDs 54, receiver 56, and transmitter 58, and adaptor controller 60. Adaptor controller 60 can be configured to perform operations pertaining to lighting-element adaptor 10*g*.

To perform functions pertaining to lighting element 10*g*, adaptor controller 60 can receive signals received by receiver 56 and respond to such signals. Such signals can include command signals and audio data signals. In response to receiving a command signal, adaptor controller 60 configures lighting-element adaptor in way indicated by the command signal, For example, command signals can indicate: i) a volume level for audio emitted from speaker 32; ii) a specific audio to be directed to the speaker, the specific audio channel being one a plurality of audio channels broadcast to lighting-element adaptor 10*g*; iii) an intensity of illumination for the lighting element received in female AC-power connector 14; iv) a color of illumination for the lighting element received in female AC-power connector 14; v) a timing sequence of intensities and colors of illumination for the lighting element received in female AC-power connector 14; vi) an intensity of illumination for the LEDs illuminating the rain guard or lamp shade 46; vii) color of illumination for the LEDs illuminating the rain guard or lamp shade 46; and/or viii) a timing sequence of intensities and colors of illumination for the LEDs illuminating the rain guard or lamp shade 46.

Examples of adaptor controller 60 can include any one or more of a microprocessor, a controller, a digital signal processor (DSP), an application specific integrated circuit (ASIC), a field-programmable gate array (FPGA), or other equivalent discrete or integrated logic circuitry.

Adaptor controller 60 can also be configured to transmit signals to other lighting-element adaptors so that such other lighting-element adaptors can also receive command signals and audio data signals. Transmitter 58 can be configured to facilitate such transmission of signals to other lighting-element adaptors. A plurality of lighting-element adaptors can be configured in a wireless mesh network, for example.

Each of AC power switch 18 and DC power switch 20 can be a mechanical switch operable by a person, or an electrically operated switch under control of adaptor controller 60.

In other embodiments, AC and/or DC power is unswitched, being continually provided in response to receiving AC power at male AC-power connector 12.

Lamp shade/rain guard 46 can be configured as a lamp-shade and/or as a rain guard. As a rain guard, lamp shade/rain guard 46 is configured to provide rain protection for female AC-power connector 14. Such protection can be provided by providing a drip edge that circumscribes female AC-power connector 14 while maintaining a sufficient separation distance therefrom. Moreover, rain protection can be also improved by configuring the drip edge to descend below female AC-power connector 14. Male AC-power connector 12 can also be protected from rain by providing a gasket or gromet that circumscribes male AC-power connector 12. Such a gasket or gromet can be configured to engage both a lower outside diameter of male AC-power connector (or a top surface of lamp shade/rain guard 46) and an inside cylindrical surface of the female AC-power connector to which AC male-power connector engages. A rubber O-ring can be used as such a gasket or gromet.

As a lamp shade, lamp shade/rain guard 46 is configured to control lighting direction and/or intensity as a function of lighting direction. Lamp shade 46 controls such lighting direction by blocking or diffusing light that is directed thereto from the lighting element received in female AC-power connector 14. Such directing of lighting can be characterized by an angle of depression, above which light emitted from the lighting element received in female AC-power connector 14 is incident upon lamp shade 46. Such an angle of depression can be defined as an angle of depression of a ray beginning on axis A and an axial position located at the center of light emission of the lighting element received in female AC-power connector 14. The ray then extends radially outward from axis A to lower circumferential edge 54 of lamp shade 46 (which can also be called drip edge 54 of rain guard 46). Such an angle of depression is shown on FIG. 7C.

Figure 9:
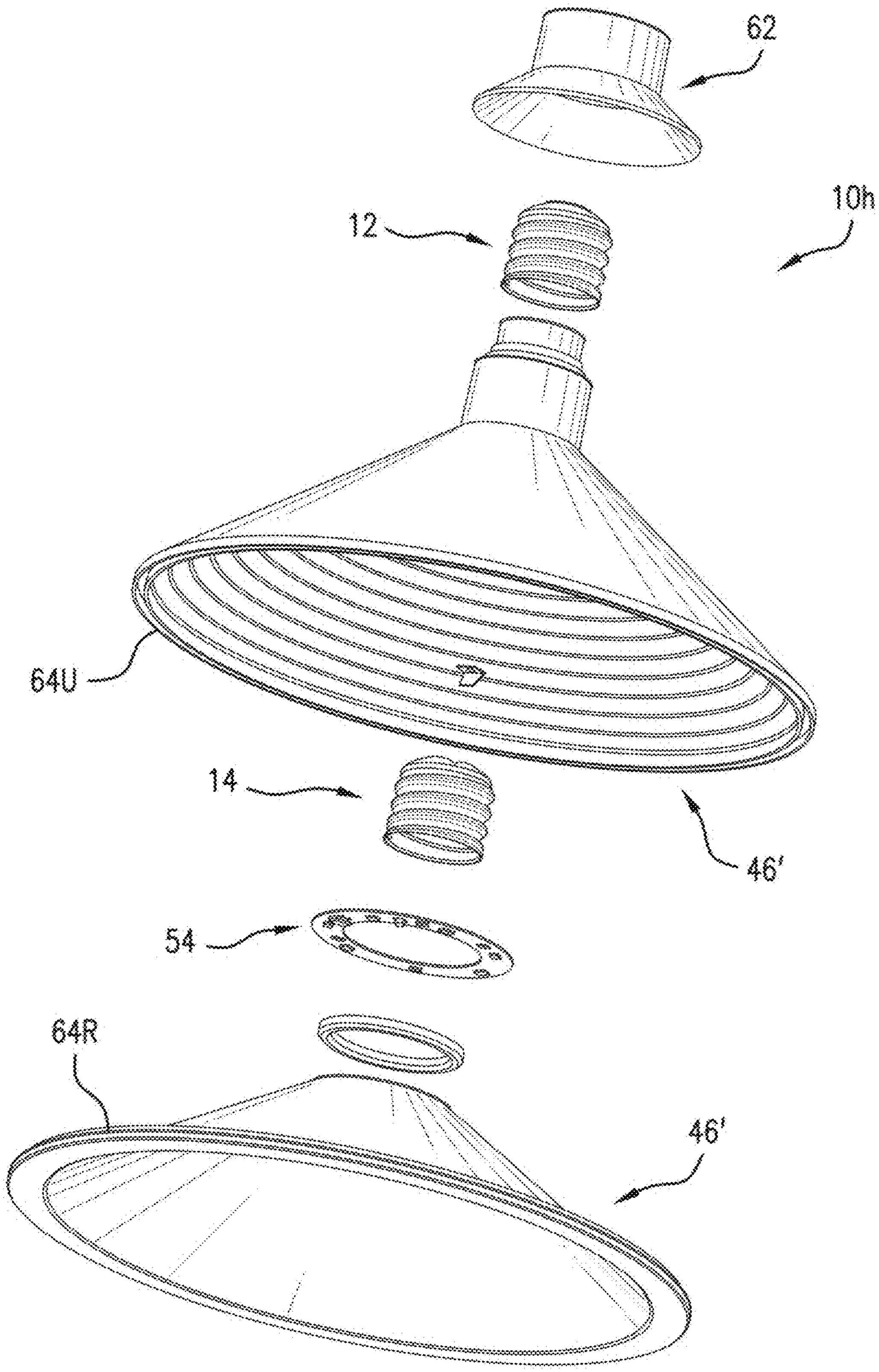
FIG. 9 is a perspective view of an embodiment of a light element adaptor with a lamp shade.

FIG. 9 is an exploded view of an embodiment of a light element adaptor with a lamp shade. In FIG. 9, lighting-element adaptor 10*h* includes male power connector 12, female power connector 14, lamp shade 46', a plurality of LEDs 54, and opaque cover 62. Male and female power connectors are axially aligned with one another along an axis. Male power connector 12 is configured to connect to an overhead lighting socket, such as for example a light socket of an overhead café light string, so as to receive electrical power therefrom and to hang therefrom. Male power connector can be configured to receive AC or DC power from the lighting socket of an overhead café light string. Female power connector 14 is configured to be provided electrical power from the electrical power received by male power connector 12. In some embodiments the power received by female power connector 14 is converted in some fashion from the power received by male power connector 12. For example, the power received by female power connector 14 can be converted from AC electrical power to DC electrical power by a power converter of lighting-element adaptor 10*h*. In other embodiments, the power received by female power connector 14 can be stepped up/down in voltage from the voltage of the electrical power received by male power connector 12. Female power connector 14 is configured to receive a lighting element so as to provide illumination to the environment below where lighting-element adaptor 10*h* hangs.

Lamp shade 46' projects outward from the axis of male and female power connectors 12 and 14. Male power connector 12 projects from a top surface of lamp shade 46' and female power connector 14 is accessible from an underside of lamp shade 46'. Unlike the embodiment depicted in FIGS. 7A-7C, in which the rain guard/lamp shade is transparent or translucent throughout, the FIG. 9 embodiment, lamp shade 46' includes upper light-transmissive layer 64U and lower non-transmissive layer 64L. Upper light-transmissive layer 64U is configured to illuminate the top surface of lamp shade 46' in response to receiving light from the plurality of LEDs 54. Upper light-transmissive layer 64 can have top-surface texture, pattern and/or discontinuities to form a pattern or texture in the top surface illumination. Lower non-transmissive layer 64L is configured to receive and block a blocked portion of light emitted from the lighting element received in the female AC-power connector. Lower non-transmissive layer 64L also is configured to block light produced by the plurality of LEDs 54 and received by upper light-transmissive layer 64U, thereby facilitating illuminations that differ from vantage points above and below lighting-element adaptor 10*h*. Lower non-transmissive layer 64L can have a top-surface reflective treatment for reflecting the light emitted from the plurality of LEDs 54 into upper light-transmissive layer 64U. For example, the top surface of lower non-transmissive layer 64L can be made white or a reflective foil can be made to fit onto lower non-transmissive layer 64L. In some embodiments, lower non-transmissive layer 64L can be made to engage upper light-transmissive layer 64U over a large area. In other embodiments, a cavity can exist between upper light-transmissive layer 64U and lower non-transmissive layer 64L.

In some embodiments, lighting element adaptor 10*h* can include one or more switches. For example, a first switch can be configured to selectively provide electrical power to the plurality of LEDs. Herein, the term 'LED' includes a variety of light sources, including, for example, Organic LEDs (OLEDs) micro-LEDs (mLEDs or μLEDs), etc. A second switch configured to selectively provide electrical power to the lighting element received in the female power connector. In other embodiments, lighting element adaptor 10*h* can be configured to include elements described above with respect to other embodiments of lighting element adaptors 10*a*-10*g*. For example, in some embodiments, lighting element adaptor 10*h* can include any of: safety tether 48, receiver 56, adaptor controller 60, speaker 32, etc.

It will be recognized that the disclosure is not limited to the implementations so described but can be practiced with modification and alteration without departing from the scope of the appended claims. For example, the above implementations may include specific combinations of features. However, the above implementations are not limited in this regard, and, in various implementations, the above implementations may include the undertaking only a subset of such features, undertaking a different order of such features, undertaking a different combination of such features, and/or undertaking additional features than those features explicitly listed. The scope of the invention should, therefore, be determined with reference to the appended claims, along with the full scope of equivalents to which such claims are entitled.

The invention claimed is:

1. A lighting-element adaptor comprising:

male and female power connectors axially aligned with one another along an axis, the male power connector configured to connect to an overhead lighting socket so as to receive electrical power therefrom, the female power connector configured to be provided electrical power from the electrical power received by the male power connector, the female power connector configured to receive a lighting element so as to provide illumination;

a rain guard projecting outward from the axis of the male and female power connectors with the male power connector projecting from a top surface of the rain guard and the female power connector accessible from an underside of the rain guard, wherein the rain guard is configured to receive and block a blocked portion of light emitted from the lighting element received in the female power connector;

a receiver configured to receive audio-control signals and/or an audio data stream; and a speaker configured to be provided electrical power from the electrical power received by the male power connector and to direct sound from the rain guard, the sound based on the audio data stream.

2. The lighting-element adaptor of claim 1, wherein each of the male and female connectors are E-type threaded lighting connectors, the male power connector having a hot contact at an end of a substantially cylindrical contacting base and a threaded neutral contact about an exterior surface of the substantially cylindrical contacting base, the female power connector having a hot contact as a bottom center of a substantially cylindrical receiving socket and a threaded neutral contact about an interior surface of the substantially cylindrical receiving socket.

3. The lighting-element adaptor of claim 1, further comprising:

a safety tether connection feature configured to facilitate connection to a safety tether secured about an overhead café light string, which provides the overhead lighting socket, such that the lighting element adapter would hang from the safety tether in response to the male power connector disengaging from the overhead lighting socket.

4. The lighting-element adaptor of claim 3, wherein the safety tether has two ends configured to couple to the rain guard on two radially opposite sides of the male power connector.

5. The lighting-element adaptor of claim 1, further comprising:

an AC/DC power converter configured to generate DC power from AC power received by the male power connector and to provide the DC power to the receiver for operation.

6. The lighting-element adaptor of claim 5, further comprising:

an adaptor controller powered by the DC power and configured to receive the audio-control signals and/or the audio data stream and control audio produced by the speaker as indicated by the audio-control signals and/or the audio data stream.

7. The lighting-element adaptor of claim 6, wherein the adaptor controller is further configured to control the receiver to receive audio data from a selected one of a plurality of audio channels.

8. The lighting-element adaptor of claim 6, wherein the adaptor controller is further configured to control a speaker volume based on the audio-control signals.

9. The lighting-element adaptor of claim 8, wherein the adaptor controller is further configured to receive lighting-control signals for controlling illumination of the lighting element received in the female power connector.

10. The lighting-element adaptor of claim 6, wherein the receiver is configured to receive the audio-control signals and/or the audio data stream multiplexed with the electrical power received from the overhead light socket.

11. The lighting-element adaptor of claim 6, wherein the receiver is configured to wirelessly receive the audio-control signals and/or the audio data stream.

12. The lighting-element adaptor of claim 11, wherein the receiver is configured to optically receive the audio-control signals and/or the audio data stream as optical signals.

13. The lighting-element adaptor of claim 11, wherein the receiver is configured to wirelessly receive the audio-control signals and/or the audio data stream as electromagnetic waves.

14. The lighting-element adaptor of claim 13, wherein the receiver is configured to wirelessly receive the audio-control signals and/or the audio data stream according to a Bluetooth protocol.

15. The lighting-element adaptor of claim 6, wherein the receiver is configured to receive the audio-control signals and/or the audio data stream multiplexed with the electrical power received from the overhead light socket.

16. The lighting element adaptor of claim 1, wherein the rain guard has a peripheral edge of the rain guard extending below the female power connector in response to gravity operating on the lighting-element adaptor hanging from the overhead lighting socket of by the male power connector.

17. The lighting element adaptor of claim 16, wherein the top surface of the rain guard has a downward slope from locations adjacent to the male AC-power connector to the peripheral drip edge of the rain guard, as measured in axial directions as a function of increasing radial directions from the axis.

18. The lighting-element adaptor of claim 6, wherein the rain guard is configured to receive and block a blocked portion of light emitted from the lighting element received in the female power connector.

19. The lighting-element adaptor of claim 18, wherein the rain guard comprises:

an upper light-transmissive layer; and a lower non-transmissive layer configured to receive and block a blocked portion of light emitted from the lighting element received in the female power connector, the lighting-element adaptor further comprising:

a plurality of Light Emitting Diodes (LEDs) configured to be provided electrical power from the electrical power received by the male power connector and to direct light into the upper light-transmissive layer of the lamp shade, thereby providing an illuminated lamp shade as seen from above.

20. The lighting-element adaptor of claim 19, wherein the adaptor controller is further configured to receive the lighting-control signals from the receiver and to control illumination of the plurality of the LEDs and/or the lighting element received in the female power connector as indicated by the lighting-control signals.

* * * * *